Feb. 24, 1942. W. HUPPERT Re. 22,035

HAIR DEVICE

Original Filed Dec. 26, 1940

INVENTOR
WILLIAM HUPPERT.
BY
Peter Dellenbaugh
ATTORNEY

Reissued Feb. 24, 1942

Re. 22,035

UNITED STATES PATENT OFFICE 22,035

HAIR DEVICE

William Huppert, New York, N. Y., assignor to Delamere Company, Inc., a corporation of Delaware Original No. 2,255,618, dated September 9, 1941, Serial No. 371,653, December 26, 1940. Application for reissue November 28, 1941, Serial No. 420,869

7 Claims. (Cl. 132—21)

This invention relates to a hair device of the kind to be worn in the hair and provided with teeth of novel form and construction for retaining the device in position and for holding the hair in place.

The tooth form, to which this invention particularly relates, is applicable to use in hair retaining combs, hairpins, or the like, and may be made of usual plastic substances, metal, or other suitable material.

According to the present invention, the device is provided with a plurality of teeth which are separated at their roots to provide spaces in which hair strands may be received, said teeth having broad or wide portions that partly overlap one another below said spaces to lock the strands of hair therein and to secure the device in position in the hair.

Other objects and advantages of the invention will appear more fully from the following description thereof, reference being had to the accompanying drawing, in which—

Figure 5:
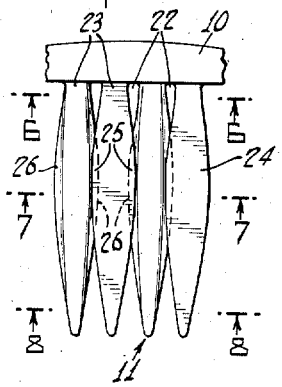
Fig. 5 is a fragmentary front view of a hair device showing a modification of the tooth form.
Figure 6:
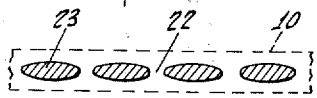
Figure 7:
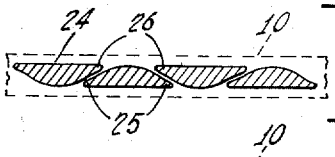
Figure 8:
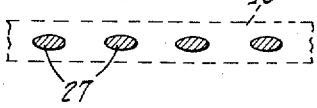
Figure 9:
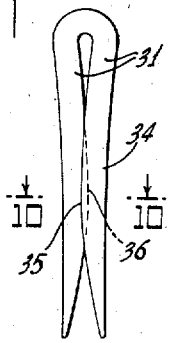

Figs. 6, 7 and 8 are sectional views of the modified tooth form taken respectively on the lines 6—6, 7—7, and 8—8 of Fig. 5;

Fig. 9 is a front view of a hairpin embodying the improved tooth forms; and

Figure 10:
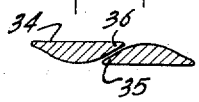

Fig. 10 is a cross-sectional view through the teeth thereof taken on the line 10—10 of Fig. 9.

The back 10 of the device or comb may be of any desired shape and ornamentation and may lie in the same plane or in a different plane from that of the teeth, for example, as shown in my Patent Reissue No. 21,131.

The teeth 11 may be curved lengthwise, as is conventional practice in such devices, to conform with the general curvature of the head, or they may be straight. It is also to be noted that the teeth are to be sufficiently resilient to permit of ingress or egress of the strands of hair between their overlapping portions.

Figure 1:
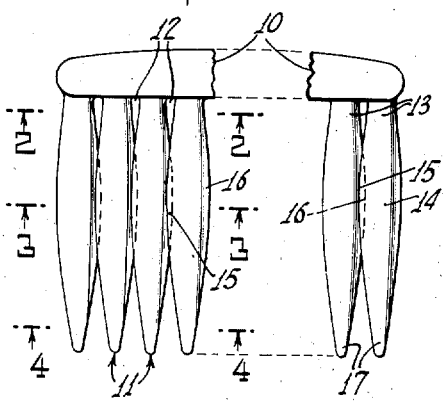
Figure 1 is a front view, partly schematic, of a hair device provided with teeth having overlapping portions.
Figure 2:
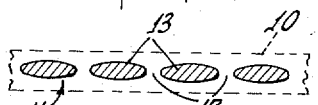
Fig. 2 is a cross-sectional view of the root portions of the teeth taken on the line 2—2 of Figure 1.
Figure 3:
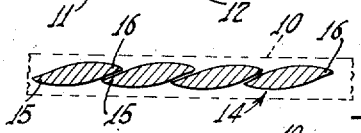
Fig. 3 is a cross-sectional view of the overlapping portions of the teeth taken on the line 3—3 of Figure 1.
Figure 4:
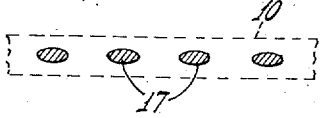
Fig. 4 is a cross-sectional view of the lower ends of the teeth taken on the line 4—4 of Figure 1.

Spaces 12 are provided for reception of the hair strands between the root portions 13 of adjacent teeth. The teeth widen from their roots toward their medial broad portions 14 in which vicinity, as will be seen on reference to Figure 1, one side edge 15 of each tooth overlaps the side edge 16 of the next succeeding tooth, as shown in Fig. 3. Whether the teeth overlap from left to right or vice versa is, of course, immaterial. The overlapping portions may contact each other, or they may be separated from each other a slight distance, that is, a distance considerably less than the thickness of the strand or quantity of hair that is to pass between the overlapping portions. The teeth narrow downward from their widest portion towards their lower end portions 17 so that at their extremities the teeth are spaced apart in the conventional manner. The wideness of the portion 14 may be symmetrical with respect to the axis of the tooth, or it may be asymmetrical, in either case its form should be such that a part thereof will overlap the corresponding portion of the next adjacent tooth.

A modification of the tooth structure is illustrated in Figs. 5 to 8. In this instance, as in that previously described, each tooth has a narrow root portion 23 with spaces 22 between the roots of adjacent teeth, a narrow lower end portion 27, and an intermediate wide or broad portion 24. The tooth structure differs, however, in that both side edges 25 of each alternate tooth overlap the corresponding side edges 26 of two adjacent teeth, as seen in Fig. 7.

An application of a tooth structure to a hairpin is depicted in Figs. 9 and 10. The teeth 31 of the hairpin are provided with intermediate widened portions 34 so disposed and formed that the side edge 35 of the wide portion of one tooth overlaps the side edge 36 of the wide portion of the other.

In use, the device is inserted and worn in the hair. The spacing between the lower ends of the teeth in a measure controls the amount of hair to be received in the spaces between the roots of each pair of teeth. As the hair passes between the overlapping portions of the teeth, and into said spaces, the teeth flex to permit of such passage and then return to normal position to grip or wedge the hair in the spaces or pockets 12 and to lock it therein, thus holding the device securely in position in the hair and retaining the hair in place.

It is to be understood that various changes in the form and shape of the tooth structure, other than those herein illustrated and described, may be made within the scope of the invention as defined in the claims.

What I claim is:

1. In a hair device of the character described, a single row of teeth having spaces between their root portions for reception of a quantity of hair, and having solid intermediate portions of greater width than their root and lower end portions and arranged with the wide portions of successive teeth overlapping each other in a common plane below said spaces.

2. In a hair device of the character described, a single row of teeth having hair receiving spaces between their root portions, each tooth having a root portion, a lower end portion, and a relatively wide solid intermediate portion, said teeth being arranged with one side edge of the wide portion of each overlapping a side edge of a wide portion of the next succeeding tooth.

3. In a hair device of the character described, a single row of teeth having hair receiving spaces between their root portions, each tooth having a root portion, a lower end portion, and a relatively wide solid intermediate portion, said teeth being arranged with both side edges of the wide portion of each tooth overlapping a side edge of the wide portions of two adjacent teeth.

4. A hair retaining comb comprising a back having a plurality of teeth extending therefrom, said teeth being spaced apart at their roots, each tooth having an intermediate wide rigid portion of a width to overlap in part the corresponding portion of an adjacent tooth.

5. A hair device of the character described comprising a back and a single row of teeth having their root ends spaced from each other to provide hair retaining openings therebetween, said teeth having rigid intermediate portions that overlap, the teeth being sufficiently resilient at their roots to permit them to flex out of their normal plane for passage of hair through the overlapping portions into the hair retaining openings and then reflex to retain the hair in said openings.

6. A hair device of the character described comprising a back and a plurality of teeth extending therefrom, said teeth having pockets between the root portions of adjacent ones, and having portions that overlap resiliently below the pockets to permit passage of hair into the pockets and to lock the hair therein, said pockets being of a shape and area to wedge and grip the hair received therein.

7. A hair device of the character described comprising a back and a plurality of teeth extending therefrom, said teeth having their lower ends spaced apart and having pockets between their root portions, each pair of teeth having intermediate portions that overlap resiliently below the pockets to permit passage of hair into the pockets and to lock the hair therein, the spacing of the lower ends of the teeth being adapted to control the amount of hair to be received in the pockets, and said pockets being of a shape and area to wedge and grip the hair received therein.

WILLIAM HUPPERT.